June 28, 1949.  R. P. KROON  2,474,258
TURBINE APPARATUS
Filed Jan. 3, 1946
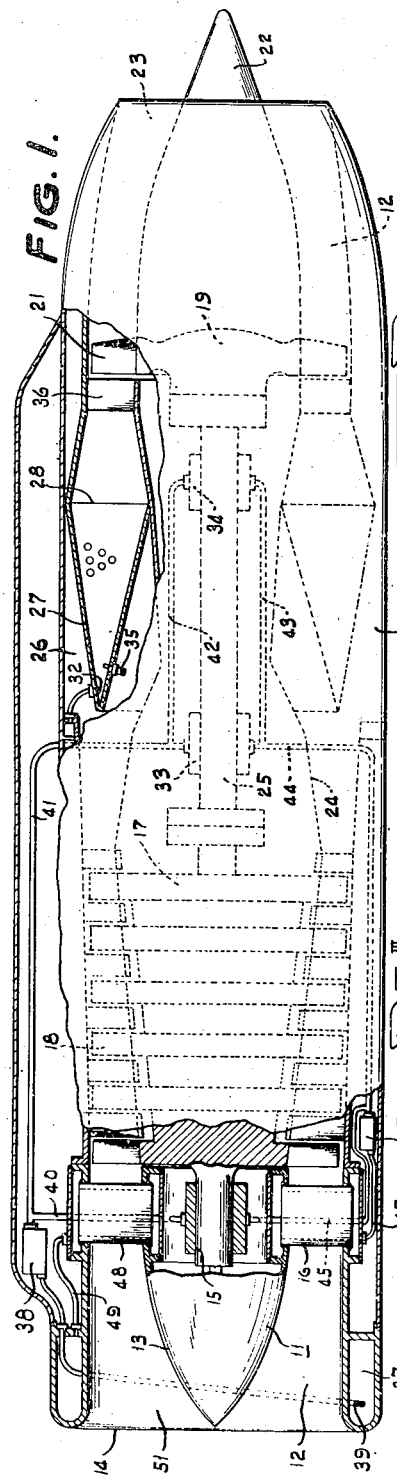
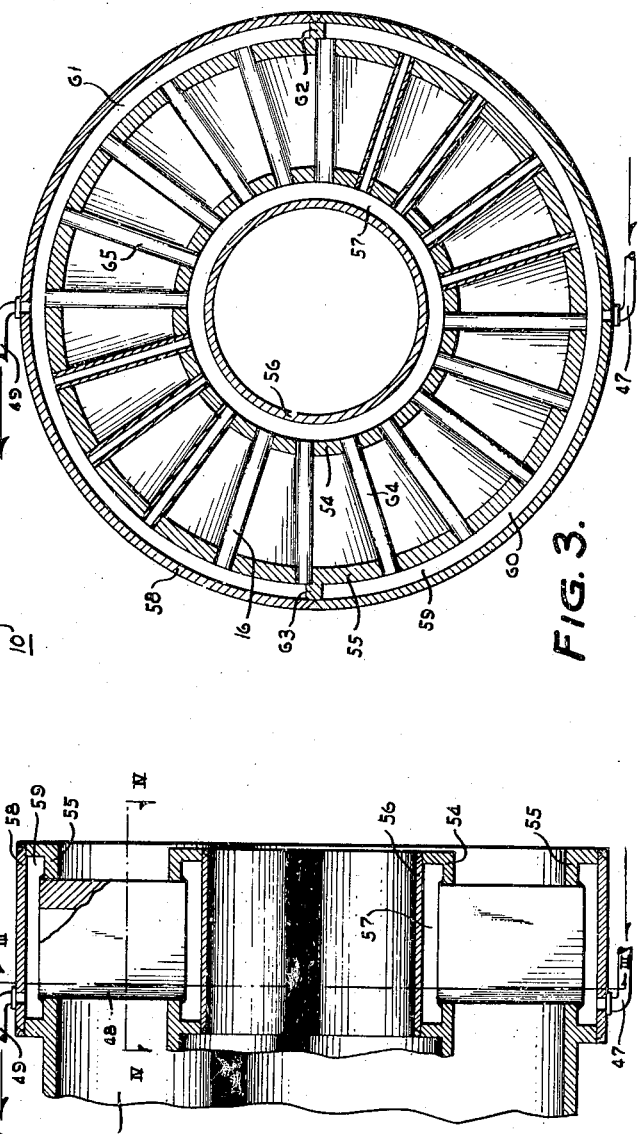
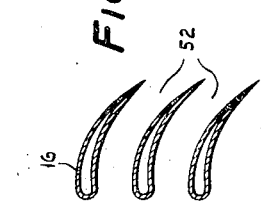
INVENTOR
REINOUT P. KROON
BY
ATTORNEY Patented June 28, 1949

2,474,258

UNITED STATES PATENT OFFICE 2,474,258

TURBINE APPARATUS

Reinout P. Kroon, Swarthmore, Pa., assignor to Westinghouse Electric Corporation, East Pittsburgh, Pa., a corporation of Pennsylvania Application January 3, 1946, Serial No. 638,794

2 Claims. (Cl. 230—207)

1

The invention relates to power plants, more particularly to means for cooling lubricating oil and de-icing the inlet guide vanes to the power plant, and it has for an object to provide improved apparatus of the character set forth.

The invention, while not limited thereto, is particularly adapted to be used to cool lubricating oil and de-ice the inlet guide vanes of a gas turbine power plant like that disclosed in the copending application of Stewart Way, Serial No. 482,533, filed April 10, 1943, now matured into Patent No. 2,405,723 of Aug. 13, 1946, and assigned to the assignee of the present invention. Such a power plant includes an axial-flow air compressor, a gas turbine driving the compressor, combustion apparatus utilizing compressed air supplied thereto by the compressor to provide heated and compressed gases for operation of the turbine, and a nozzle utilizing gases exhausting from the turbine to provide a propulsion jet, all of these components being housed in line within a tubular casing. A plant of this character is particularly suitable for propelling aircraft at high speeds and it operates generally as follows: Air enters the forward end of the tubular casing for compression by the compressor; the compressed air is then heated in the heating or combustion apparatus by the combustion of fuel supported by the compressed air to provide motive fluid delivered to the turbine, which drives the compressor; and motive fluid issuing from the turbine is discharged through the propulsion nozzle as a jet, the reaction of which serves to propel the aircraft.

In the operation of a power plant of the above-mentioned type under adverse weather conditions, icing may occur on the compressor inlet guide vanes, and when this occurs, the effective cross-sectional area is reduced, thus reducing the quantity of air flowing to the air heating apparatus. This reduction in air flow will diminish the thrust or power output; also, due to the fact that a reduced quantity of combustion and cooling air is flowing through the air heating apparatus, the exhaust gas temperature may rise to a dangerous degree, thereby causing damage to, or destruction of, the power plant.

In accordance with the present invention, there is provided means, which will prevent ice forming on the inlet guide vanes for the air compressor and at the same time act as a cooler for the lubricating oil system.

It is another object of the invention to provide hollow inlet guide vanes for the air compressor of an aircraft power plant, adapted to

2 have circulated therethrough heated oil from the lubricating system to cool the same.

It is another object of the invention to provide means for de-icing the inlet guide vanes for an air compressor of an aircraft power plant by circulating heated medium therethrough.

It is another object of the invention to provide hollow inlet guide vanes for the air compressor of an aircraft power plant, adapted to have circulated therethrough heated oil from the lubricating system to cool the oil and de-ice the guide vanes.

A further object of the invention is to provide an oil cooler which will de-ice the inlet guide vanes to the compressor and which will be relatively safe from damage due to foreign objects.

A still further object of the invention is to provide a combined lubrication oil cooler and de-icer for the inlet guide vanes which will have an overall weight reduction, and at the same time eliminate special de-icing apparatus.

These and other objects are effected by the invention as will be apparent from the following description and claims taken in connection with the accompanying drawings, forming a part of this application, in which:

Fig. 1 is a diagrammatic side elevational view of a gas turbine power plant in which the present invention has been incorporated, a portion of the outer casing structure being broken away to show details of construction;

Fig. 2 is an enlarged diagrammatic sectional view of a portion of the inlet of the power plant as shown in Fig. 1;

Fig. 3 is a sectional view taken on the line III—III of Fig. 2, looking in the direction indicated by the arrows; and, Fig. 4 is a partial sectional view taken on the line IV—IV of Fig. 2, looking in the direction indicated by the arrows, showing the inlet guide vanes.

Referring now to the drawings, the power plant shown in Fig. 1 comprises in general an outer tubular casing structure 10, open from end to end and having a central core 11 providing, with the casing, an annular flow passage 12, which, if the plant is to be used for propelling an airplane, is adapted to extend fore and aft with respect to the latter.

The central core structure 11 is supported by the outer casing structure 10 along its longitudinal axis and includes a hollow fairing cone 13 defining with the forward or left end (Fig. 1) of the casing 10, an air inlet 14. The fairing cone 13 may be utilized to house a starter, gearing for driving auxiliary apparatus (not shown), and a front bearing 15, and it is supported from the casing 10 by a plurality of hollow compressor inlet guide vanes 16.

The core 11 also includes a rotor 17 of an axial-flow compressor 18, a rotor 19 of a gas turbine 21 and a longitudinally adjustable conical tailpiece 22, which defines, with the rear end of the casing 10, an adjustable propulsion nozzle 23.

The intermediate portion of the core structure between the compressor 18 and the turbine 21 comprises an inner wall structure 24 which houses a shaft 25, supported by an intermediate bearing 33 and a rear bearing 34, respectively, for connecting the turbine rotor 19 and compressor rotor 17. The inner wall structure 24 defines, with the outer casing 10, an annular chamber 26 connecting the compressor blade passage and the turbine blade passage.

The chamber 26 is provided with suitable air heating means, such as shown in the copending application of Stewart Way et al., Serial No. 511,468, filed November 23, 1943, for heating the air compressed by the compressor. In the embodiment herein shown, an annular, perforated, tapered burner tube 27 is mounted in the annular chamber 26 with its open end 28 directed downstream. Fuel is supplied to the burner tube 27, by atomizing nozzles 32, from a fuel supply (not shown). Suitable means, including spark plugs 35, are provided to initiate and maintain ignition of the air-fuel mixture in the burner tube for continuous combustion.

In operation, air enters at the inlet 14, is compressed by the compressor 18, and flows into the annular chamber 26. The compressed air then passes through the openings in the walls of the burner tube 27 and mixes with the atomized fuel supplied by the nozzles 32. The air and fuel mixture is ignited by the spark plugs and burns steadily thereafter. The motive fluid comprising the products of combustion and the excess air flows from the burner tube 27 and is directed by guide vanes or nozzles 36 into the blade passage of the turbine rotor 19. The turbine extracts at least sufficient energy from the motive fluid to drive the compressor 18 and other auxiliary apparatus. The gases leaving the turbine are discharged through the propulsion nozzle 23 at a high velocity so that the remaining available energy in the motive fluid is effective to propel the aircraft. The tailpiece 22 is preferably axially movable with respect to the casing 10 so that the back pressure on the turbine and the jet effect produced by the nozzle may be varied.

In order to lubricate the front, intermediate and rear bearings 15, 33 and 34, in the above-mentioned power plant, a lubricating oil system is provided. This lubrication oil system is preferably of the closed recirculating type, and, in the embodiment shown, has a reservoir 37, preferably placed around the air inlet portion of the power plant, intermediate the outer shell 10 and the inner annular flow path 12, although it may be situated at any convenient location. Preferably, a forced feed lubricating pump 38, driven in any suitable manner, is disposed between the reservoir 37 and the bearings. The lubricating pump 38 withdraws oil from the reservoir 37 by means of a suction conduit 39 and discharges the oil at high pressure to a plurality of supply conduits 40, 41 and 42 for the delivery of lubricating oil to the front, intermediate, and rear bearings 15, 33 and 34, respectively, and to any other additional equipment which may require lubrication. It is to be understood that the usual safety devices, such as, for example, relief valves and by-passes for the protection of the lubricating system, have been deleted for the sake of clearness.

When the oil passes through the bearings, to lubricate and cool the same, it is preferably collected and delivered, by a plurality of conduits 43, 44 and 45, to scavenging pump means, generally indicated at 46. This scavenging pump means 46 is fully described in the copending application of Albert S. Thompson, Serial No. 520,488, filed January 31, 1944, now matured into Patent No. 2,402,467 of June 18, 1946 and assigned to the assignee of the present invention. The details of the scavenging pump 46 form no part of the present invention; however, its general object is to provide means to insure the removal of oil after it passes through the bearings. This positive removal of oil helps to prevent leaks on the low-pressure side of the system, and to provide means for forcing the heated return oil through a conduit 47 to the hollow guide vanes 16. These hollow guide vanes 16 are also utilized as a heat exchanger 48 to cool the oil flowing therethrough. After passing through the heat exchanger 48, the oil flows through a conduit 49 into the reservoir 37 to be recirculated.

The present invention is concerned with means for preventing icing at the inlet of the gas turbine power plant and, more particularly, with the prevention of ice formation at the most vulnerable point of the inlet, that is, at the compressor inlet guide vanes 16, and at the same time, to provide efficient cooling of the lubricating oil.

The compressor inlet guide vanes 16, which also form the heat exchange apparatus 48, are disposed circumferentially in the forward suction portion 51 of the annular flow path 12 and they define flow passages 52, as shown in Fig. 4, for the passage of air therebetween. Such guide vanes 16 accelerate and direct the incoming air in the proper direction, prior to entering the first stage of the compressor 18, to increase compression efficiency. Due to the position of the guide vanes 16 in the annular flow path 51, they are the first members met by the air and present an apparent solid surface (see Fig. 3), and also, at this point the velocity of the air in increased above, and the pressure descreased below, that at any other part of the inlet 14.

Therefore, it is at the inlet guide vanes 16 that icing is most likely to occur, and due to the high air velocity, the heat exchange rate will also be high. The provision of the heat exchanger 48 in the inlet guide vanes 16 for oil cooling, will, therefore, heat the guide vanes to prevent ice forming thereon and at the same time provide a high heat transfer rate heat exchanger.

In order to incorporate the above-mentioned oil cooling heat exchanger 48 in the hollow guide vanes 16, there is provided the usual inner and outer vane-supporting shrouds 54 and 55, respectively, which are punched to receive, and adapted to be rigidly fastened to, the inner and outer ends of the hollow guide vanes 16 without obstructing the hollow interior thereof. This unobstruction of the interior of the guide vanes provides for fluid flow paths therethrough.

Cooperating with, and spaced from the inner shroud 54, is an inner tubular member 56 which provides an inner annular distributing or return manifold 57. In this embodiment (Fig. 3), the inner annular manifold 57 is in direct communication with the inner ends of all of the hollow guide vanes 16. Likewise, the outer shroud 55 cooperates with an outer tubular member 58 to provide an outer annular chamber 59. The outer ends of the hollow guide vanes 16 are all in direct communication with this outer chamber 59; however, this outer chamber 59 is divided into an inlet manifold 60 and an outlet manifold 61 by a pair of oppositely-spaced partitions 62 and 63. These partitions 62 and 63 are disposed so that approximately one-half of the outer ends of the guide vanes open into the inlet manifold and the other half open into the outlet manifold.

With the above partition arrangement, the guide vanes 16 are divided into two groups 64 and 65, which are connected in series by the inner manifold 57, and each group consists of a plurality of hollow vanes 16 providing parallel flow paths therethrough. It is to be understood that by arranging partitions in the inner and outer manifolds, any combination of series and parallel flow paths may be provided to cool the oil, depending upon requirements determined by the various characteristics of the lubrication system, such as, for example, the rate of flow, quantity, temperature, size of guide vanes, etc.

The inlet manifold 60 receives the heated return oil discharged by the scavenging pump 46 through the conduit 47, and distributes it for parallel flow through the guide vanes 16 in the group 64. The oil flowing through this group 64 of vanes is discharged to the inner annular manifold 57, wherein it is delivered to the second group 65 of vanes for parallel flow therethrough. After passing through this second group of vanes, the oil is collected in the outlet manifold 60 and flows through the conduit 47 to the reservoir 37 for recirculation.

It can be seen that from the time the heated oil enters the first group 64 of guide vanes until it leaves the second group 65, the oil is cooled by the air flowing through the passages 52 between the guide vanes, and that at this particular location the air velocity is very high, which consequently produces a high heat transfer rate. Also, the oil cooler will not produce an additional pressure drop because of its oil cooling function, as it is an integral part of the compressor 18. Furthermore, as the oil is cooled, the guide vanes 16 are heated, which prevents ice accumulating thereon.

It should be noted that, by utilizing the inlet guide vanes for oil cooling, additional oil cooling equipment is eliminated, which, in the embodiment shown, will permit a shorter annular air inlet duct and consequently smaller inlet pressure loss, and this feature thereby reduces the overall length of the power plant with an overall weight reduction.

Another feature of importance is that, as a result of this construction, the center of gravity may be moved further forward and, in some installations, such as, for example, military aircraft, the oil cooler is less vulnerable to puncture by bullets, etc.

While the invention has been shown in but one form, it will be obvious to those skilled in the art that it is not so limited, but is susceptible of various changes and modifications without departing from the spirit thereof.

What is claimed is:

1. In an aircraft gas turbine power plant including an axial flow compressor having its inlet open to the atmosphere approximately in the direction of flight and comprising a rotor, a stator, a bearing for said rotor near the forward end thereof, a housing for said bearing, a plurality of axially spaced rows of moving blades carried by the rotor, a plurality of rows of stationary blades carried by the stator and disposed between the rows of moving blades, a row of stationary vanes extending generally radially between said bearing housing and the stator upstream of the first row of moving blades for supporting the bearing housing from the stator and for guiding entering air to the first row of moving blades, and means for heating said vanes to prevent formation of ice thereon.

2. Structure as specified in claim 1, wherein the vanes are hollow and the last-mentioned means includes apparatus for passing through the hollow vanes lubricant from the bearing, whereby the vanes are heated and the oil is cooled.

REINOUT P. KROON.

REFERENCES CITED

The following references are of record in the file of this patent:

UNITED STATES PATENTS

| Number | Name | Date |
|---|---|---|
| 1,042,506 | Vallat | Oct. 29, 1912 |
| 1,088,585 | Junkers | Feb. 24, 1914 |
| 2,050,385 | Schmidt | Aug. 11, 1936 |
| 2,234,777 | Puffer | Mar. 11, 1941 |
| 2,399,865 | Halford | May 7, 1946 |